United States Patent Office 3,333,000
Patented July 25, 1967

3,333,000
PREPARATION OF AMINE OXIDES
Harry Elmer Albert and Paul Gordon Haines, Lafayette Hill, Pa., assignors to Pennsalt Chemicals Corporation, Philadelphia, Pa., a corporation of Pennsylvania
No Drawing. Filed May 25, 1964, Ser. No. 370,093
5 Claims. (Cl. 260—583)

This invention relates to an improved process for the preparation of tertiary amine oxides. More particularly the process of the invention deals with a procedure whereby a trialkylamine is oxidized with hydrogen peroxide to the corresponding tertiary amine oxide in the presence of an alkali metal polyphosphate and an alkali metal bicarbonate.

It is known to oxidize trialkylamines to amine oxides with hydrogen peroxide. For example, German Patent No. 937,058 discloses the oxidation of an aqueous solution of trialkylamine with hydrogen peroxide and indicates that with concentrated hydrogen peroxide solutions on the order of about 30% by weight, the reaction must be carried out at low temperatures on the order of −40 to 0° C. in order to avoid excessive heat build-up and explosion hazards. In addition, our experience has shown that oxidation procedures where no catalyst is employed gives poor yields of amine oxides, the yields being on the order of 30%.

It has now been found that tertiary amines may be safely oxidized in aqueous systems to obtain essentially quantitative yields of amine oxide. In accord with this invention, aqueous hydrogen peroxide is used as the oxidant and there is present in the reaction mass an alkali metal bicarbonate and an alkali metal polyphosphate. An additional advantage of the process of this invention is that the reaction need not be carried out at extremely low temperatures, but may be initiated at room temperature and easily controlled, if necessary, by use of a jacketed reaction kettle through which cooling water flows and/or by feed rate of the hydrogen peroxide. A further advantage of the process of the invention is that the procedure does not require the use of expensive catalysts and in view of the extremely high yields and simple procedures which may be used, an extremely low cost, highly efficient process for amine oxide manufacture is achieved. Further advantages of the process of this invention will be apparent from the more detailed description which follows.

The process of this invention is carried out without the need for an organic solvent system. Aqueous hydrogen peroxide will be used as the oxidant and the commercially available solutions containing approximately 30% by weight of $H_2O_2$ are quite satisfactory and are preferred. However, other concentrations of $H_2O_2$ may be used and even anhydrous $H_2O_2$ may be employed if it is not considered too hazardous to handle in any particular situation. Preferably, however, aqueous solutions having a hydrogen peroxide content from about 5% to 75% by weight of $H_2O_2$ will be employed. The amount of peroxide used should be essentially stoichiometric. Less than stoichiometric amounts will, of course, leave tertiary amine unreacted. On the other hand, large excesses of peroxide are operable, but contribute nothing to the process. If an excess is to be employed about 10% of the stoichiometric amount may be used for such purposes so as to insure completion of the reaction, for example.

The alkali metal polyphosphate additive which will be present during the reaction will usually be added in an amount between about 0.02% and 2.0% by weight of the amine employed, the preferred amount being 0.05 to 1.0%. The polyphosphate may be sodium, potassium or other alkali metal polyphosphate and may be used as the readily available hydrate. Of the useful polyphosphates an alkali metal pyrophosphate ($P_2O_7^{-4}$) is preferred, but other useful polyphosphates include dimetaphosphates ($P_2O_6^=$), trimetaphosphates ($P_3O_9^=$), hexametaphosphates ($P_6O_{18}^{-6}$), tetraphosphates ($P_4O_{13}^{-6}$), decaphosphates ($P_{10}O_{31}^{-12}$), tripolyphosphates ($P_3O_{10}^{-5}$), and the like.

Likewise, the alkali metal bicarbonate will be present in an amount between about 0.02% to 2% and will preferably be on the order of about 0.05% to 1.0% by weight. Preferably, sodium bicarbonate will be used although other alkali metal salts such as potassium, lithium, etc., may be employed. It will also be understood that bicarbonate precursors may be used in place of bicarbonate salts; e.g. alkali metal carbonates may be used to generate bicarbonate in situ.

The mixture of bicarbonate and polyphosphate appears to be acting in a catalytic manner to enhance reaction of peroxide with the tertiary amine. While reaction will occur without these additives, or with either one alone, the rate of reaction and/or yield of amine oxide in such instances is very low. With the mixture, however, a very surprisingly efficient reaction is obtained.

The process conditions and techniques used to carry out the process of the invention are easily attained. Temperatures of between about 20° and 75° C. will normally be used. Although the mode of addition may be varied it is preferred to add the hydrogen peroxide solution to a stirred mixture of the amine, bicarbonate, and polyphosphate.

In the general procedure of carrying out the oxidation process of the invention, tertiary amine (preferably, but not necessarily anhydrous) is charged to the reaction vessel and the bicarbonate and polyphosphate added to act as the catalyst. The reaction vessel is fitted with a stirrer, a reflux condenser, and means for adding the hydrogen peroxide. Control of temperature is obtained by heating or cooling as required by the reaction conditions, and provision is made for temperature indication. Agitation is started and hydrogen peroxide is added at a rate chosen so as not to exceed the desired reaction temperature. The reaction is maintained by adding the peroxide and the extent of completion of the reaction is determined by sampling at various times and titrating the hydrogen peroxide idiometrically with standard sodium thiosulfate solution. The reaction is continued until less than about 1% of the hydrogen peroxide charged remains in the reaction vessel. After completion of the reaction, the charge is distilled to remove any unchanged dialkylamine, the distillation being carried out under reduced pressure. The amine oxide may be isolated in the form of its picrate or other salt. However, amine oxides are also useful for conversion to hydroxylamines and, where this is desired, the amine oxide concentrate may be used without isolation procedures.

The amines that will be employed in this process may be any tertiary amine having the formula $R_1R_2R_3N$ where $R_1$, $R_2$, and $R_3$ are alkyl groups containing from 1 to about 6 carbon atoms; that is, the tertiary amines will be tri-lower alkyl tertiary amines. The $R_1$, $R_2$ and $R_3$ groups may be the same or different, and thus operable amines in this process include trimethylamine, triethylamine, tributylamine, methyldiethylamine, ethyldimethylamine, triamylamine, tri-n-hexylamine, n-butyldiethylamine, and the like.

Other major advantages of the process of this invention are that the trialkylamine oxide obtained is water-white in color and has an extremely low content of trialkylamine nitrate as impurity. Trialkylamine nitrates are frequently formed in previously used processes where tertiary amines are oxidized and such nitrates, of course, present explosion hazards and are thus very undesirable by-products.

The following example will serve to more fully illustrate the invention.

EXAMPLE

Hydrogen peroxide was fed in dropwise to a rapidly stirred mixture of triethylamine and catalyst in a reflux overhead condenser system to prevent loss of the volatile amine. The hydrogen peroxide feed time was two hours for an 800-g. batch of 35% peroxide. Stirring was continued at the reaction temperature until a small withdrawn sample showed that the $H_2O_2$ concentration had decreased to a negligible amount. The samples were analyzed by addition to acidified KI solution and thiosulfate titration of the liberated iodine.

After stopping the stirrer, any unreacted triethylamine was removed as a top layer. The amine oxide solution was concentrated by distillation of some of the water from it under reduced pressure. At 135 mm. a small forefraction was removed from which a further small quantity of triethylamine was recovered. Distillation of water was continued at 25 mm. to a pot temperature of 80° C. The concentrated amine oxide solution was analyzed by titration with standard acid.

The table which follows indicates additional reaction conditions and results obtained.

ample of the invention without departing from its spirit and scope.

We claim:

1. In the process of oxidizing a trialkylamine to an amine oxide by contacting said amine with hydrogen peroxide, the improvement of carrying out said oxidation in the presence of an alkali metal polyphosphate and an alkali metal bicarbonate.

2. The process of preparing a tri-lower alkylamine oxide which comprises contacting a mixture of a tri-lower alkylamine, alkali metal pyrophosphate and alkali metal bicarbonate with an essentially stoichiometric amount of an aqueous solution of hydrogen peroxide.

3. The process of oxidizing in an aqueous system a tri-lower alkylamine employing an oxidizer essentially stoichiometric amounts of hydrogen peroxide, said oxidation being carried out in the presence of 0.02 to 2.0 weight percent of the amine of an alkali metal bicarbonate and 0.02 to 2.0 weight percent of the amine of an alkali metal pyrophosphate.

4. The process of claim 3 wherein the amine is triethylamine.

5. The process of claim 3 wherein the amine is triethylamine and the amounts of bicarbonate and pyrophosphate are each between about 0.05% and about 1.0%.

TABLE I.—PREPARATION OF AMINE OXIDES

| Reactants | | Catalyst | Reaction Temp., °C. | Analysis of Amine Oxide Solution | Yield of Amine oxide based on $H_2O_2$, percent | Comments |
|---|---|---|---|---|---|---|
| Feed of 35% $H_2O_2$ | Amount of triethylamine | | | | | |
| 200 grams | 200 grams | None | 54 to 68 | 78.3% amine oxide / 2.6% amine nitrate | 30.8 | No catalyst. |
| 800 grams | 808 grams | 2.6 g. $NaHCO_3$ | 68 | Not processed to completion because 130 g. triethylamine remained unreacted indicating large $H_2O_2$ loss in side reactions | | Use of $NaHCO_3$ alone. |
| Do | 848 grams | 2.6 g. $Na_4P_2O_7 \cdot 10H_2O$ | 68 | Not processed to completion because 117 g. of triethylamine was unreacted | | Use of pyrophosphate alone. |
| Do | 818 grams | 0.4 g. $Na_4P_2O_7 \cdot 10 H_2O$ / 2.6 g. $NaHCO_3$ | 68 | 82.26% amine oxide / 1.06% amine nitrate | 100 | Use of 0.05% sodium pyrophosphate and 0.33% of sodium bicarbonate. |
| Do | 848 grams | 2.6 g. $Na_4P_2O_7 \cdot 10 H_2O$ / 2.6 g. $NaHCO_3$ | 68 | 85.16% amine oxide / 0.19% amine nitrate | 99.5 | Use of 0.31% sodium pyrophosphate and 0.31% sodium bicarbonate. |
| Do | do | 2.6 g. $Na_4P_2O_7 \cdot 10 H_2O$ / 2.6 g. $NaHCO_3$ | 68 | 84.71% amine oxide / 0.22% amine nitrate | 100 | Use of 0.31% sodium pyrophosphate and 0.31% sodium bicarbonate. |
| Do | do | 2.6 g. $Na_4P_2O_7 \cdot 10 H_2O$ / 2.6 g. $NaHCO_3$ | 68 | 83.78% amine oxide / 0.11% amine nitrate | 100 | Last 40 g. of the triethylamine was added 3 hrs. after the original 808 g. |

When the pyrophosphate in the above example is replaced with other polyphosphates, such as sodium tripolyphosphate and sodium hexametaphosphate essentially the same result is obtained.

It will be understood that numerous changes and variations may be made from the above description and ex- References Cited

UNITED STATES PATENTS 3,270,060  8/1966  Wakeman et al. _____ 260—583

CHARLES B. PARKER, *Primary Examiner.*

R. L. RAYMOND, *Assistant Examiner.*